Sept. 25, 1951 W. P. BURTON ET AL 2,568,717
SEPARATION OF ORGANIC COMPOUNDS
Filed Oct. 28, 1948 2 Sheets-Sheet 1

INVENTORS
WILLIAM P. BURTON
HENRY G. McGRATH
BY
ATTORNEYS

Patented Sept. 25, 1951

2,568,717

UNITED STATES PATENT OFFICE 2,568,717

SEPARATION OF ORGANIC COMPOUNDS

William P. Burton, Orange, and Henry G. McGrath, Elizabeth, N. J., assignors to The M. W. Kellogg Company, Jersey City, N. J., a corporation of Delaware Application October 28, 1948, Serial No. 56,928

5 Claims. (Cl. 260—450)

This invention relates to the separation of organic compounds and relates more particularly to an improved process for the separation of oxygenated organic compounds from the reaction product obtained in the catalytic hydrogenation of oxides of carbon at elevated temperatures. Still more particularly, the invention relates to an improved process for the separation and recovery of oxygenated organic compounds from hydrocarbons present in the reaction product obtained in the hydrogenation of oxides of carbon in the presence of a reducible metal catalyst, wherein these oxygenated compounds comprise alcohols, and acids, and may also comprise esters, aldehydes and ketones, depending upon the conditions of the reaction.

It is, therefore, an object and the process of this invention is directed to provide for an improved process for the separation of the aforementioned oxygenated organic compounds from hydrocarbons present in the reaction product obtained in the catalytic hydrogenation of oxides of carbon, in order to effect efficient and economical recovery of relatively high yields of such compounds.

Another object of the invention is to provide for an improved process for the separation of the aforementioned oxygenated organic compounds from hydrocarbons present in the reaction product obtained in the catalytic hydrogenation of oxides of carbon, employing a combination of a minimum number of steps, consistent with efficient and economical recovery of relatively high yields of such compounds.

Other objects and advantages inherent in the invention will be apparent from the following more detailed disclosure.

In carrying out the objects of the invention, we employ a novel combination of steps, as more fully hereinafter described, in which the aforementioned synthesis reaction product is condensed and separated into oil, water-product, and uncondensed gas phases which are subsequently treated in a series of interrelated steps from which the aforementioned separation between oxygenated organic compounds and hydrocarbons is obtained. In effecting such separation between the various compounds present in the reaction product, we are able to obtain: separation of alcohols and acids, either in aqueous solution or in a substantially anhydrous condition; separation of ketones boiling not higher than methyl ethyl ketone; separation of aldehydes boiling not higher than propionaldehyde; and hydrocarbons, substantially water-free, as products of the process.

Figure 1:
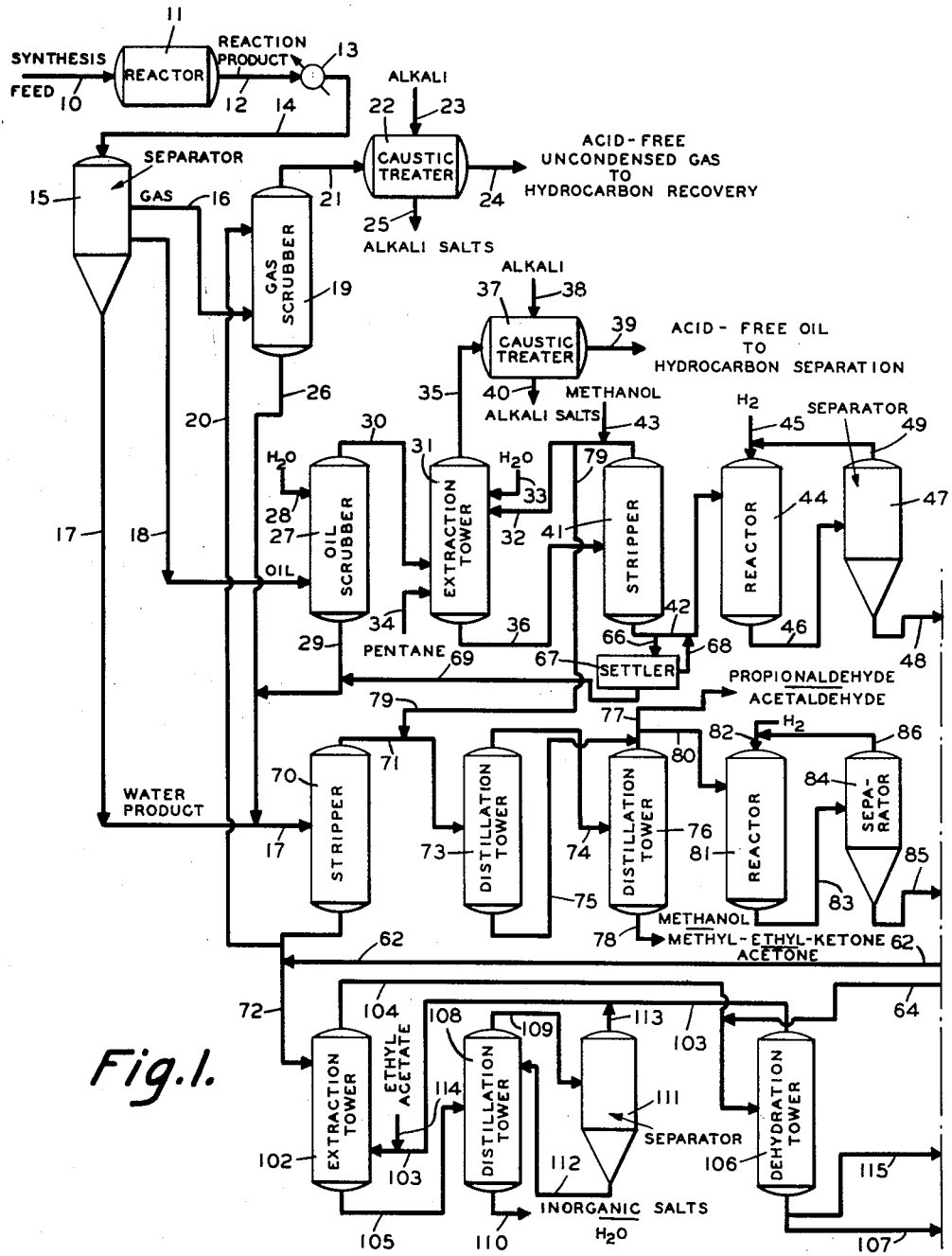
Figure 2:
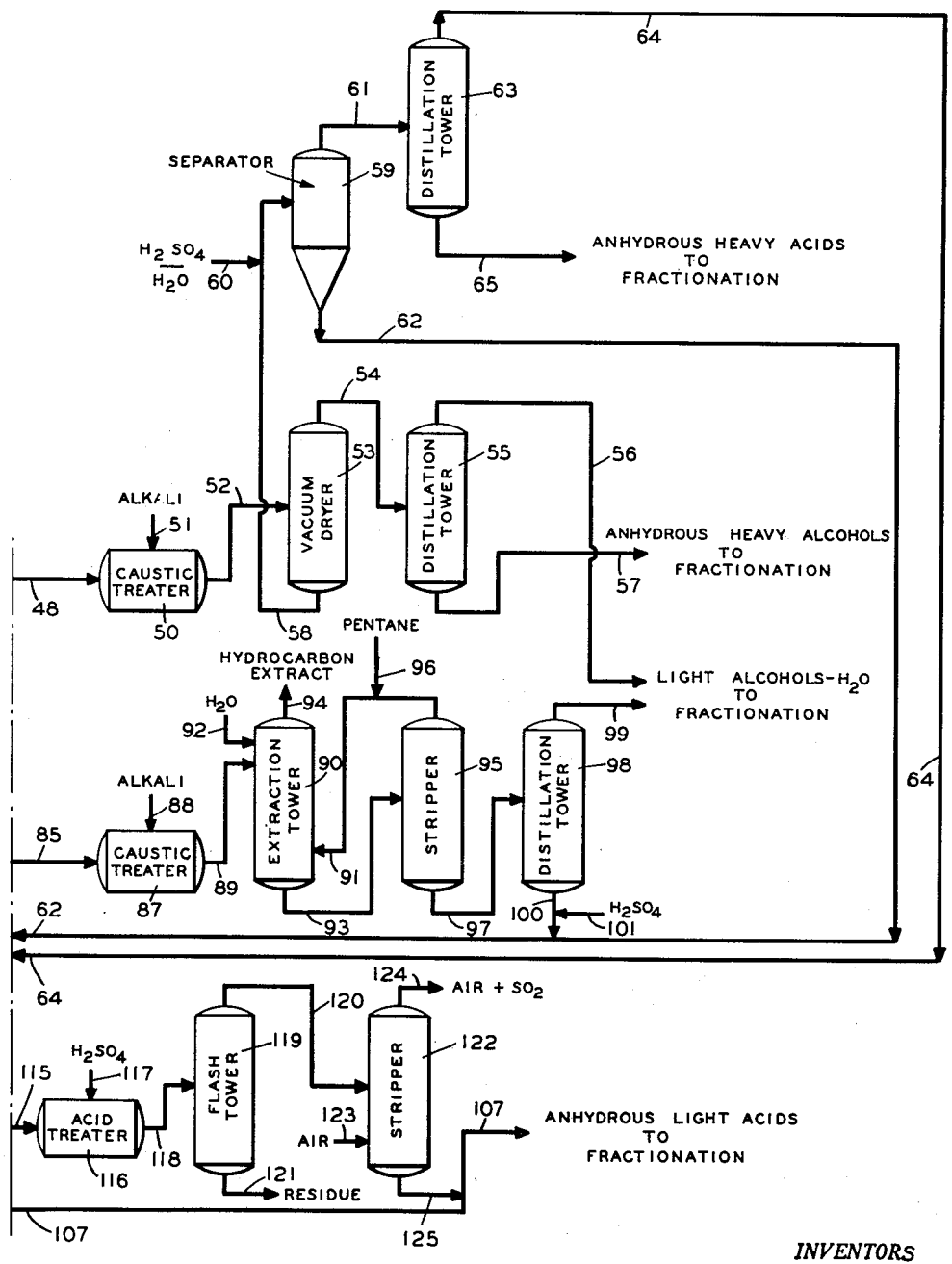

Figures 1 and 2, taken together, represent a vertical elevation of the apparatus herein employed.

The accompanying drawing illustrates diagrammatically one form of the apparatus employed and capable of carrying out one embodiment of the process of the invention. While the invention will be described in detail by reference to the embodiment illustrated in the drawing, it should be noted that it is not intended that the invention be limited thereto, but is capable of other embodiments which may extend beyond the scope of the apparatus illustrated. Furthermore, the distribution and circulation of liquids and vapors is illustrated in the drawing by a diagrammatic representation of the apparatus employed. Valves, pumps, compressors, coolers and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, at varying mol ratios, such as 2:1, is supplied through line 10 and transferred through this line to a synthesis reaction vessel, represented in the drawing by reactor 11. In reactor 11, the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form substantially as it comes from the reactor within the aforementioned temperature range, containing water, methane and higher hydrocarbons, and oxygenated organic compounds comprising $C_2$ and higher acids, methanol and higher alcohols and which may also comprise aldehydes, ketones, esters, and depending upon the condition of the reaction, is first cooled to condense substantially large quantities of normally liquid components. Conveniently, condensation may be effected in a plurality of cooling stages which are represented diagrammatically in the drawing by cooler 13 with which line 12 connects. From cooler 13 the resulting mixture of condensate and uncondensed gases passes through line 14 to a separator 15. In the latter, the gases are withdrawn through line 16 and the condensate separates as a lower aqueous phase and an upper oil phase. Both phases thus obtained contain oxygenated organic compounds; those of lower molecular weight tending to remain in the aqueous phase, while those of higher molecular weight tend to remain in the oil phase. The aqueous phase is drawn off from the bottom of separator 15 through line 17 and the oil phase is drawn off at an intermediate point through line 18. It should be noted that apparatus embodying more than one separation stage may be employed, if desired; for example, primary and secondary separation stages may be introduced, operating successively and respectively at temperatures of about 150° F. and about 100° F.

The gases separated in separator 15 are passed through line 16 to a low point in a suitable scrubbing vessel 19. In this gas scrubber, the gases are intimately contacted with an aqueous solution of relatively light organic acids, obtained from the source hereinafter described, in order to extract the oxygenated compounds present. For this purpose, this aqueous solution is introduced into scrubber 19 at an upper point through line 20. The scrubbed gaseous effluent, essentially free of oxygenated organic compounds and comprising a mixture of the relatively lighter hydrocarbons, is withdrawn overhead through line 21. This mixture is next treated with alkali in order to effect neutralization of traces of organic acids that may be present. For this purpose, the mixture of hydrocarbons in line 21 is next transferred through this line to a caustic treater 22, in which it is intimately mixed with alkali in a suitable amount through line 23. After the components of the mixture are maintained in intimate contact for a time sufficient to effect the desired neutralization of traces of organic acids present in the aforementioned hydrocarbon mixture, the treated mixture is separated in the form of an upper gaseous hydrocarbon phase, substantially acid-free and a lower aqueous phase comprising alkali salts of organic acids. The aforementioned upper phase is withdrawn from treater 22 through line 24 for further use or treatment outside the scope of the present process. The lower aqueous phase from treater 22 is withdrawn through line 25, and may be subjected to conventional methods of treatment, known to those skilled in the art, for the conversion of the alkali salts to their corresponding free organic acids.

The remaining mixture of oxygenated organic compounds in scrubber 19, comprising methanol and higher alcohols, C₂ and higher aldehydes, ketones, acids and esters is transferred through line 26 and combined with the water-product liquid phase withdrawn from separator 15 through line 17, for further treatment in the process hereinafter described. The oil phase separated in separator 15 is transferred through line 18 to a low point in an oil scrubber 27, in which the oil is contacted intimately with water to absorb in the water the oxygenated compounds which are dissolved in the oil and which are relatively more soluble in water, such as the relatively low-boiling alcohols, ketones, aldehydes and acids. Water employed for this purpose is introduced to the upper part of scrubber 27 through line 28. The scrubbing water containing dissolved oxygenated compounds is withdrawn from the bottom of oil scrubber 27 through line 29, and is transferred through line 26 and combined with the water-product withdrawn from separator 15 through line 17, for further treatment in the process hereinafter described.

The scrubbed oil is withdrawn overhead from scrubber 27 through line 30. This oil, comprising essentially a mixture of organic acids, alcohols, esters, aldehydes, ketones and hydrocarbons, is transferred through line 30 to a point in an extraction tower 31. In tower 31 oil introduced through line 30 is subjected to intimate countercurrent contact with a relatively light alcohol as a treating agent, such as methanol or ethanol, which is introduced into tower 31 at an upper point through line 32. The alcohol treating agent and the oil are contacted in tower 31 under conditions effective to absorb in the treating agent substantially all of the oxygenated compounds contained in the oil and thus effect separation of these oxygenated compounds from hydrocarbons present. As a result of the foregoing treatment, a lower aqueous alcohol layer and an upper hydrocarbon or oil layer are formed in tower 31. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the alcohol treating agent is substantially prevented. To obtain such dilution, water is introduced into tower 31 at an upper point above the alcohol inlet through line 33. The use of water in the manner described is effective not only for the purpose of alcohol dilution, but its introduction at an upper point in tower 31 accomplishes the result of washing the upper hydrocarbon or oil layer free of the added alcohol treating agent.

Aqueous methanol used as a treating agent in the present embodiment is not, however, completely selective in effecting total extraction of oxygenated organic compounds from hydrocarbons present in tower 31. Hence, the liquid flowing down tower 31 will contain some hydrocarbons in solution in addition to oxygenated organic compounds. These hydrocarbons may comprise a mixture of proportionately small quantities of all the hydrocarbons present in the oil stream entering tower 31 through line 30, and would render separation of pure oxygenated compounds highly difficult. A relatively light hydrocarbon stream functioning as a wash-oil is therefore introduced at a point near the bottom of tower 31 through line 34. This hydrocarbon stream effects the washing of the lower aqueous methanol layer in tower 31, free of hydrocarbons contained therein, leaving the methanol layer saturated with the wash-oil. It is desirable that this wash-oil be of such composition that there are no components present in a substantial amount that are heavier than the highest boiling hydrocarbon which forms an azeotrope with the alcohol treating agent. The boiling point of the wash-oil selected must therefore be substantially within or below the boiling range of the oxygenated compounds that are to be separated. Hence, we may use such wash-oils as butane, pentane, hexane, or heptane or mixtures thereof. Following the above-mentioned wash-oil treatment, there is present in tower 31 an upper hydrocarbon or oil layer containing substantially all the hydrocarbons that were present in the oil stream entering tower 31 through line 30, and a portion of the wash-oil; and there is also present a lower aqueous methanol layer saturated with wash-oil and containing extracted oxygenated compounds. The upper hydrocarbon or oil layer is withdrawn overhead as a raffinate from tower 31 through line 35, while the lower aqueous methanol layer is withdrawn as an extract through line 36. The aforementioned mixture of hydrocarbons withdrawn as an overhead raffinate through line 35 is next treated with alkali in order to effect neutralization of traces of organic acids that may be present. For this purpose, the mixture of hydrocarbons is next transferred through line 35 to a caustic treater 37, in which it is intimately mixed with alkali in a suitable amount introduced through line 38. After the components of the mixture are maintained in intimate contact for a time sufficient to effect the desired neutralization of traces of organic acids present in the aforementioned hydrocarbon mixture, the treated mixture is permitted to settle in order to form an upper hydrocarbon phase, substantially acid-free, and a lower aqueous phase comprising alkali salts of organic acids. The aforementioned upper phase is withdrawn from treater 37 through line 39 for further use or treatment outside the scope of the present process. The lower aqueous phase from treater 37 is withdrawn through line 40, and may be subjected to conventional methods of treatment known to those skilled in the art, for the conversion of the alkali salts to their corresponding free organic acids.

The lower aqueous methanol layer from tower 31, saturated with wash-oil and containing oxygenated compounds, is transferred through line 36 to a fractionation tower 41. Tower 41, functioning as a methanol stripper, is operated under conditions effective to separate the aqueous methanol layer, introduced from tower 31 through line 36, into an overhead alcohol fraction comprising essentially methanol and hydrocarbons which is withdrawn through line 32, and a lower fraction normally consisting of two phases; one phase comprising oxygenated compounds and the other phase comprising water containing some dissolved oxygenated compounds. These combined phases are withdrawn as bottoms through line 42. The overhead alcohol fraction from tower 41 is withdrawn through line 32 as a vapor, and is cooled to liquefy methanol and hydrocarbon components. The mixture of methanol and hydrocarbons thus liquefied is transferred through line 32 into tower 31 for repeated use as the methanol treating agent in the process hereinbefore described. Make-up methanol is introduced through line 43 via line 32 with which line 43 connects. Bottoms from tower 41, comprising an aqueous mixture of dissolved oxygenated compounds, namely, relatively heavy alcohols, aldehydes, ketones, acids and relatively smaller proportions of esters, are next transferred through line 42 to a hydrogenation reactor 44. Reactor 44 is provided for effecting catalytic hydrogenation, by conventional methods, of aldehydes and ketones present in the aforementioned mixture to their corresponding alcohols. Hydrogen employed in reactor 44 is introduced through line 45. Following the conversion of aldehydes and ketones into alcohols in hydrogenation reactor 44, the product of the reaction is withdrawn as bottoms through line 46. Bottoms thus obtained are cooled and transferred through line 46 to a separator 47. In separator 47, separation is obtained between the aqueous mixture of alcohols, acids and esters which is withdrawn as bottoms through line 48, and free hydrogen which is recycled to reactor 44 through line 49, via line 45, with which line 49 connects.

In order to obtain substantially complete separation of alcohols from organic acids and esters present in the aqueous mixture in line 48, this mixture is next contacted with an alkali or an aqueous solution of an alkali to convert the organic acids to an aqueous solution of their corresponding alkali salts and to saponify esters. For this purpose, the mixture in line 48 is next transferred through this line to a caustic treater 50 in which it is intimately mixed with alkali, such as sodium or potassium hydroxide, in a suitable amount introduced through line 51. The resulting mixture from treater 50, comprising an aqueous solution of alcohols and alkali salts of organic acids is withdrawn through line 52.

We have found that if the above-mentioned aqueous mixture of alcohols and alkali salts of organic acids is subjected to phase separation, substantially complete separation between alcohols and alkali salts cannot be obtained by reason of the mutual solubility of the components of these phases. We have also found that simple distillation of the alcohols from alkali salts is not feasible, inasmuch as the boiling point of some of the alcohol components present are too high to permit distillation without decomposition at atmospheric pressure. To overcome the resulting disadvantages when employing the above-mentioned procedures, we next subject the aforementioned mixture to reduced pressure to evaporate substantially all of the alcohols present in order to leave dry alkali salts as a residue, as more fully explained in our prior and co-pending application Serial No. 776,366, filed September 26, 1947. For this purpose, the mixture in line 52 is next preheated by any suitable conventional means (not shown in the drawing) to raise the temperature of the mixture to a temperature approximately at which evaporation will take place, but below the point of decomposition of any of the components of the mixture. The heated mixture is next transferred through line 52 to an evaporation chamber, represented in the drawing by vacuum dryer 53. In dryer 53 the mixture is next subjected to evaporation or flashing at a reduced pressure, below atmospheric pressure such as a combined vapor pressure of the solution and alcohols of not more than 25 mm. of mercury as disclosed in the aforementioned application Serial No. 776,366. At this point, it should be noted that the aforementioned operation may be carried out batch-wise or as a continuous operation. In continuous operations, the feed in line 52 may be fed into dryer 53 as a spray, the resulting alcohol vapors being taken overhead and the remaining dry salts withdrawn from the bottom through a vacuum seal, such as a lock hopper. When it is desired to carry out the foregoing operation step as a continuous process, this may also be effected by the use of an enclosed drum dryer. In the latter method, the alcohols are evaporated from the hot surface of the drums and the remaining salt cake continuously scraped from the rotating drum and discharged through a vacuum seal.

The separated alcohols in dryer 53 are withdrawn overhead as vapors through line 54. These vapors are next condensed and transferred through line 54 to a distillation tower 55. Tower 55 is heated under proper operating conditions of temperature and pressure to distill overhead the relatively low-boiling alcohols as an aqueous mixture, which are withdrawn through line 56 and which may be transferred to suitable conventional fractionation apparatus for the separation of individual components. Bottoms from tower 55, comprising relatively heavier alcohols, substantially water-free, are withdrawn through line 57 and may also be transferred to suitable conventional fractionation apparatus for the separation of individual components.

The separated dry alkali salts of organic acids are withdrawn as bottoms from tower 53 through line 58. These salts are transferred by gravity through line 58 to a separator 59. In order to effect regeneration of the organic acids in line 58 from their salts, an inorganic acid is introduced into this line through line 60. The inorganic acid thus introduced into line 58 through line 60 may be a high-boiling inorganic acid having a boiling point higher than that of water, such as sulfuric acid, or an inorganic acid which forms a maximum boiling azeotrope with water, such as hydrochloric acid.

The resulting aqueous mixture in separator 59, comprising free organic acids and alkali salts of the introduced inorganic acid, will separate into two phases. By reason of their insolubility in the water solution, the relatively heavier organic acids will be obtained as an upper acid-rich phase in separator 59 and are withdrawn overhead through line 61. The lower water-rich phase which is formed in separator 59, comprising inorganic salts and relatively lighter water-soluble organic acids, is withdrawn as bottoms through line 62, for further treatment in the process hereinafter described.

The upper acid-rich phase withdrawn from separator 59 through line 61, comprising the aforementioned relatively heavier organic acids, may also contain some of the relatively lighter acids and water in minor proportions. This mixture is, therefore, next transferred through line 61 to a distillation tower 63. Tower 63 is operated under proper conditions of temperature and pressure effective to distill overhead an aqueous mixture of the relatively light acids which is withdrawn as a relatively low-boiling mixture through line 64 for further treatment in the process hereinafter described, while the relatively heavier acids will separate out as a lower relatively high-boiling fraction, which is withdrawn through line 65, in a substantially anhydrous condition and may be transferred to any conventional acid fractionation system in which individual acids may be recovered for further use outside the scope of the present process.

At this point it should be noted that the aforementioned bottoms from tower 41 (comprising an aqueous mixture of dissolved oxygenated compounds, namely, relatively smaller proportions of esters), may be subjected to a preliminary separation stage, if so desired, prior to the aforementioned hydrogenation in reactor 44. For this purpose, the mixture in line 42 may be transferred through line 66 to a settler 67 to effect separation at this point between oil-soluble and water-soluble chemicals present in the mixture. Such separation may be desirable, inasmuch as the absence of water in reactor 44 will facilitate the ease with which hydrogenation of aldehydes and ketones to alcohols can be effected. In settler 67 there are thus obtained an upper oil layer and a lower aqueous layer, each layer containing a portion of each class of compounds present in the mixture in line 42. The upper oil layer from settler 67 is next transferred to reactor 44 through line 68 via line 42 for hydrogenation of aldehydes and ketones to alcohols, as previously described. The lower aqueous layer from settler 67 is withdrawn through line 69, combining with the bottoms from oil scrubber 27 in line 29, and the combined stream transferred through line 29 into line 26 where it is further combined with the water product liquid phase in line 17.

As indicated above, the streams combined in line 17, comprise an aqueous mixture of methanol and higher alcohols, $C_2$ and higher aldehydes, ketones, acids and esters. This aqueous mixture is next transferred through line 17 to a distillation tower 70 which functions as an alcohol stripper. In tower 70, the mixture of oxygenated compounds is heated under proper operating conditions of temperature and pressure effective to distill overhead alcohols, aldehydes, ketones and esters which are withdrawn through line 71. Bottoms obtained from tower 70, comprising an aqueous solution of relatively light organic acids, are withdrawn through line 72 for further treatment in the process hereinafter described. As previously indicated, the gases in scrubber 19 are intimately contacted with an aqueous solution of relatively light organic acids to extract oxygenated compounds present. It is, therefore, possible to transfer the bottoms from tower 70 (comprising an aqueous mixture of relatively light organic acids) withdrawn through line 72, directly into scrubber 19, via line 20 with which line 72 connects.

The overhead from tower 70 comprising a mixture of relatively light alcohols, aldehydes, ketones and esters is transferred through line 71 to a distillation tower 73. In tower 73 the mixture is heated under proper operating conditions of temperature and pressure effective to distill overhead the lowest boiling components of the mixture which may be acetaldehyde, propionaldehyde, methanol, methyl ethyl ketone and acetone which are withdrawn through line 74. Bottoms from tower 73, comprising relatively light alcohols and ketones, are withdrawn through line 75. These bottoms may contain alcohols having up to eight or more carbon atoms per molecule, aldehydes boiling higher than propionaldehyde, and may contain in addition, ketones, esters, traces of organic acids and water. The overhead from tower 73, may next be transferred through line 74 to a distillation tower 76. Tower 76 is heated under conditions of temperature and pressure effective to distill overhead the lowest boiling components of the mixture which boil not higher than propionaldehyde. These components may be withdrawn through line 77 for further use or treatment outside the scope of the present process. Bottoms from tower 76, comprising those oxygenated compounds boiling not higher than the boiling point of methyl ethyl ketone (and which normally include methanol and acetone), are withdrawn through line 78 for further use or treatment also outside the scope of the present process. It should be noted at this point that where so desired, methanol present in line 32, as previously indicated, may be transferred from this line through line 79 and combined with the overhead from tower 70 in line 71, with which line 79 connects, for further separation in the process hereinbefore described.

As stated above, the overhead from tower 76 comprises the lowest boiling components of the mixture introduced into this tower, through line 74, which boil not higher than propionaldehyde.

This overhead may next be withdrawn through line 77, as stated above, or combined in line 77 with the bottoms from tower 73 through line 78, with which line 77 connects. Thus there is obtained in line 77, a mixture which may comprise alcohols having up to eight or more carbon atoms per molecule, aldehydes, ketones, esters, traces of organic acids and water. This mixture is next transferred through line 80 to a hydrogenation reactor 81. Reactor 81 is provided for effecting catalytic hydrogenation, by conventional methods, of aldehydes and ketones present in the aforementioned mixture to their corresponding alcohols. Hydrogen employed in reactor 81 is introduced through line 82. Following the conversion of aldehydes and ketones into alcohols in reactor 81, the product of the reaction is withdrawn as bottoms through line 83. Bottoms thus obtained are cooled and transferred through line 83 to a seperator 84. In separator 84, separation is obtained between the aqueous mixture of alcohols, acids and esters which is withdrawn as bottoms through line 85, and free hydrogen which is recycled to reactor 81 through line 86, via line 82, with which line 86 connects.

In order to obtain substantially complete separation of alcohols from organic acids and esters present in the aqueous mixture in line 85, this mixture is next contacted with an alkali or an aqueous solution of an alkali, such as sodium hydroxide or potassium hydroxide, to convert the organic acids to an aqueous solution of their corresponding alkali salts and to saponify esters. For this purpose, the mixture in line 85 is next transferred through this line to a caustic treater 87, in which it is intimately mixed with alkali in a suitable amount introduced through line 88. The resulting mixture from treater 87, comprising an aqueous solution of alcohols and alkali salts of organic acids, is withdrawn through line 89.

The aforementioned aqueous solution of alcohols and alkali salts of organic acids in line 89, may contain relatively small quantities of hydrocarbons as impurities. These hydrocarbons present in the above mixture, must be removed in order to effect the subsequent recovery of pure alcohols. It has been found that the hydrocarbons tend to concentrate as their homogenous alcohols azeotropes in the distillation cuts taken between the various alcohols. In such aqueous alcohol solutions, contaminating hydrocarbons can be removed efficiently and economically by means of one or more hydrocarbons which are themselves readily removable. In principal, the process may be considered as one of dilution rather than extraction, in that the undesirable hydrocarbons are replaced by one or more of the aforementioned hydrocarbons which may be readily eliminated.

Such a hydrocarbon may be n-pentane, which is highly suitable in over-all use as applied to the aforementioned process and as evidenced by experimental laboratory data. It should be noted, that the operation is not restricted to the sole use of pentane for the purpose indicated, but that other lighter or heavier hydrocarbons may also be successfully employed, such as butane or heptane. Butane has the advantage of not being known to form an azeotrope with methanol, although it has a high solubility in aqueous alcohol solutions. On the other hand, it may be desirable to use heavier hydrocarbons as a solvent such as hexane, the latter being less soluble than pentane but requiring the stripping of lighter hydrocarbons out of the hexane as well as the stripping of hexane from the heavier hydrocarbons. The choice of a suitable hydrocarbon will be influenced by its solubility and by its boiling point or the boiling points of its azeotropes with light alcohols.

To effect the removal of such contaminating hydrocarbons, the mixture from caustic treater 87 is transferred through line 89 to an extraction tower 90. In tower 90 the mixture introduced through line 89, is subjected to intimate countercurrent contact with pentane or other selected suitable hydrocarbon treating agent, which is introduced at a low point into tower 90 through line 91. The treating agent and the aforementioned alcohol mixture, containing hydrocarbons, are contacted in tower 90 under conditions effective to absorb in the treating agent, the hydrocarbons present. In order to prevent loss of a portion of the resulting alcohol phase produced in tower 90 in the treating agent extract, water may be introduced at an upper point into tower 90 through line 92 to reabsorb the alcohol from the extract thus obtained. The bottoms thus produced in tower 90, comprising an aqueous mixture of alcohols having up to eight or more carbon atoms per molecule, alkali salts of heavy organic acids, excess alkali and a portion of the pentane treating agent, are withdrawn through line 93 for further treatment in the process hereinafter described. The overhead from tower 90, comprising the bulk of the pentane treating agent and higher hydrocarbons, together with small quantities of alcohols, is withdrawn through line 94 for further use or treatment outside the scope of the present process. The bottoms from tower 90 are next transferred through line 93 to a distillation tower 95, to effect the removal of the pentane treating agent from the alcohol stream. In tower 95, the mixture is heated under proper conditions of temperature and pressure, to distill overhead pentane which is withdrawn through line 91 for further use in tower 90 in the process hereinbefore described. Make-up pentane is introduced into line 91 through line 96, with which line 91 connects.

As a result of the process, hereinbefore described, bottoms from tower 95 withdrawn through line 97, comprise an aqueous mixture of alcohols, salts of organic acids and excess alkali. This aqueous mixture is next transferred through line 97 to a distillation tower 98. Tower 98 is operated under proper conditions of temperature and pressure effective to distill overhead an aqueous solution of relatively light alcohols which are withdrawn through line 99, and which may be transferred to any conventional fractionation apparatus, known to those skilled in the art, for the separation of individual alcohol components. Bottoms from tower 98, comprising an aqueous mixture of salts of organic acids and excess alkali are withdrawn through line 100.

In accordance with the process of the invention, the aqueous mixture in line 100 is next subjected to further treatment in order to release organic acids present from their salts. This mixture is, therefore, contacted in line 100 with a high-boiling inorganic acid having a boiling point higher than that of water, such as sulfuric acid, or an inorganic acid which forms a maximum boiling azeotrope with water, such as hydrochloric acid. The inorganic acid thus employed is introduced into line 100 through line 101, with which line 100 connects. The resulting solution in line 101, comprising inorganic salts, excess quantities of the introduced inorganic acid, released organic acids, and excess water, is transferred through line 101 and combined with the aforementioned lower water-rich phase from separator 59 in line 62, comprising inorganic salts and relatively lighter water-soluble organic acids.

As hereinbefore described, the bottoms withdrawn from tower 70 through line 72 comprise an aqueous mixture of relatively light organic acids. These bottoms may next be combined in this line with the aforementioned aqueous mixture of relatively light organic acids, inorganic salts and excess quantities of the introduced inorganic acid present in line 62, for further treatment. Accordingly, the combined stream in line 72 is next transferred to an extraction tower 102. In tower 102 the stream introduced through line 72 is subjected to intimate countercurrent contact with an oxygen-containing solvent treating agent as an acid extractor, such as ethyl acetate, ethyl ether, isopropyl ether, or ketones such as methyl propyl ketone, either singly or in admixture, which is introduced into tower 102 through line 103. The treating agent and the aqueous stream of organic acids are contacted in tower 102 under conditions effective to absorb in the treating agent a large proportion of the acids contained in the aqueous stream of organic acids passing through line 72. The extract thus produced comprises an acid-rich mixture containing organic acids, excess quantities of the solvent treating agent and proportionately small quantities of water, and is withdrawn overhead from tower 102 through line 104. Bottoms from tower 102, comprising a raffinate containing a portion of the solvent treating agent and proportionately large quantities of water, are withdrawn through line 105.

The extract from tower 102, comprising an acid-rich mixture containing organic acids, excess quantities of the solvent treating agent and proportionately small quantities of water, is withdrawn overhead through line 104 and transferred through this line to a dehydration tower 106, which functions as a stripper for the solvent treating agent. Tower 106 is heated under conditions of temperature and pressure effective to distill overhead a mixture containing substantially all of the solvent treating agent and water present in line 104, which is withdrawn through line 103, and is transferred through this line for further use as the solvent in tower 102 in the process described above. Bottoms from tower 106, comprising substantially waterfree $C_2$ and heavier organic acids, solvent-free, are withdrawn through line 107, and may be transferred to any conventional acid fractionation system in which individual acids may be recovered for further use outside the scope of the present process.

As hereinbefore described, the raffinate from tower 102 contains a portion of the solvent treating agent and proportionately large quantities of water, inorganic salts and excess quantities of the introduced inorganic acid. This raffinate is next transferred through line 105 to a distillation tower 108 tower 108 is heated under conditions of temperature and pressure effective to distill overhead water-azeotropes of the solvent treating agent which are withdrawn through line 109. Bottoms from tower 108, comprising excess water, inorganic salts and any excess quantities of the introduced inorganic acid that may be present are withdrawn through line 110. The water-azeotropes of the solvent treating agent which are withdrawn overhead from tower 108 through line 109 are transferred into a separator 111. In separator 111 separation is effected between an upper layer, comprising the solvent treating agent, and a lower water-layer which is withdrawn as bottoms through line 112 and is transferred into tower 108 for further treatment in the process described above. The upper layer from separator 111, comprising the solvent treating agent, is withdrawn through line 113 and transferred via line 103, with which line 113 connects, for further use in tower 102 as described above. Make-up solvent is introduced into line 103 through line 114 with which line 103 connects. At this point, it should be noted that, as previously described, the overhead withdrawn from tower 63 through line 64 comprises an aqueous mixture of relatively light organic acids. Accordingly, this mixture may next be transferred through line 64 into line 103 for dehydration in tower 106 as described above.

In some instances, the mixture of substantially water-free organic acids withdrawn from tower 106 through line 107, may contain very small amounts of alcohols and carbonyls as impurities. If so desired, it is possible to remove these impurities by methods such as polymerization. Accordingly, the mixture in line 107 may be transferred through line 15, with which line 107 connects, to an acid treater 116. In treater 116 the mixture is contacted with a polymerizing agent such as an inorganic acid which may be sulfuric acid, which is introduced through line 117 in an amount sufficient to polymerize any of the aforementioned impurities present, in the form of a sludge. The resulting mixture from treater 116 is next transferred through line 118 to an evaporation tower, represented in the drawing by flash tower 119. In tower 119 the mixture is subjected to flashing to effect separation between anhydrous light organic acids which are withdrawn through line 120, and polymerized alcohols and carbonyls which are withdrawn as a residue through line 121. The mixture of anhydrous acids withdrawn through line 120 may contain some quantities of sulfur as contaminants. This mixture is next transferred through line 120 to a stripping zone, represented in the drawing by stripper 122, where it is air-blown with air being introduced at a low point in stripper 122 through line 123. As a result of the treatment in stripper 122, sulfur present in the acid mixture introduced through line 120 is withdrawn overhead in the form of sulfur dioxide through line 124; while substantially water-free light organic acids, free of any of the aforementioned contaminants, are withdrawn through line 125, via line 107 with which line 125 connects, for further fractionation of individual acid components.

As previously stated, the novelty of the present invention resides in a combination of steps in which the aforementioned synthesis reaction product is condensed and separated into oil, water-product and uncondensed gas phases which in turn are subsequently treated in a series of interrelated steps from which separation between the aforementioned oxygenated organic compounds and hydrocarbons is obtained. Among the most important of these interrelated steps are:

(I) Separation of the reaction product into three phases (namely, an uncondensed gas phase, oil-product and water-product liquid phases); water scrubbing the oil-product liquid phase to obtain a lower water-layer comprising dissolved oxygenated compounds and hydrocarbons; separating these layers; subjecting the upper oil-layer to extraction treatment with an aqueous solution of a water-soluble alcohol to obtain a raffinate comprising a major portion of hydrocarbons and a minor portion of oxygenated organic compounds present in the upper oil-layer, and an extract comprising a major portion of oxygenated compounds and a minor portion of hydrocarbons present in this layer; extracting the extract with a hydrocarbon wash-oil to absorb hydrocarbons present; neutralizing the raffinate to obtain an upper phase comprising acid-free hydrocarbons and a lower phase comprising an aqueous solution of alkali salts; combining the lower water-layer obtained from water-scrubbing of the oil-product liquid phase with water-product liquid phase; fractionating the combined streams into a relatively low-boiling fraction comprising non-acid oxygenated compounds and a minor portion of organic acid present in the water-product liquid phase, and a relatively high-boiling fraction comprising a major portion of organic acids present in the water-product liquid phase; scrubbing the uncondensed gas phase with the aforementioned relatively high-boiling fraction to obtain a scrubbed gaseous effluent comprising a major portion of hydrocarbons and a minor portion of organic acids present in the uncondensed gas phase and a lower water-layer comprising dissolved oxygenated compounds; combining the last-mentioned lower water-layer with the water-product liquid phase for further treatment; and neutralizing the scrubbed gaseous effluent to obtain an upper phase comprising acid-free hydrocarbons and a lower phase comprising an aqueous solution of alkali salts.

(II) The steps of I in which the extract obtained from the treatment of the upper oil-layer with the aqueous solution of the water-soluble alcohol is hydrogenated to convert aldehydes and ketones present to their corresponding alcohols.

(III) The steps of I and II in which the lower water-layer obtained from water-scrubbing of the oil-product liquid phase is combined with the water-product liquid phase; the combined streams are fractionated to produce a relatively high-boiling fraction comprising a major portion of acids present in the water-product liquid phase; and these acids are subjected to extraction with an oxygen-containing solvent as a water-entrainer to produce substantially water-free organic acids, upon subsequent solvent recovery.

(IV) The steps of II in which the hydrogenated extract, comprising alcohols, acids and esters is treated with an alkali to convert the acids to their corresponding salts and to saponify esters; the resulting mixture is subjected to reduced pressure to evaporate substantially all of the alcohols from the alkali salts. The alcohols are acidified with an inorganic acid to produce a mixture comprising the corresponding organic acids and inorganic salts; and the organic acids are separated from the inorganic salts.

(V) The steps of IV in which the mixture of organic acids and inorganic salts is separated into an upper acid-rich phase comprising a portion of the acids and water, and a lower water-rich phase comprising the remainder of these acids and inorganic salts; the lower water-rich phase is subjected to extraction with an oxygen-containing solvent as a water-entrainer; to obtain an extract comprising organic acids free of the inorganic salts; and substantially water-free organic acids and obtained upon subsequent solvent recovery.

(VI) The steps of I in which the lower water-layer is combined with the water-product liquid phase; the combined streams are fractionated into a relative low-boiling fraction comprising non-acid oxygenated organic compounds and a minor portion of organic acids present in the water-product liquid phase and a relatively high-boiling fraction comprising a major portion of acids present in the water-product liquid phase; the relatively low-boiling fraction is hydrogenated to convert aldehydes and ketones present to their corresponding alcohols and to form a mixture comprising alcohols, organic acids and esters; the mixture thus formed is treated with alkali to convert the organic acids to their corresponding alkali salts and to saponify esters; and alcohols are separated from the alkali salts.

While a particular embodiment of the present invention has been described for purposes of illustration, it should be understood that various modifications and adaptations thereof, which will be obvious to one skilled in the art, may be made within the spirit of the invention as set forth in the appended claims.

Having thus described our invention, we claim:

1. In a process for treating the reaction product obtained in the hydrogenation of oxides of carbon wherein said reaction product is treated to form an oil-product liquid phase and a water-product liquid phase, each of said phases containing oxygenated organic compounds comprising organic acids and alcohols, and wherein said water-product liquid phase is fractionated into a relatively low-boiling fraction comprising alcohols and a relatively high-boiling fraction comprising organic acids, the improvement which comprises: water-scrubbing said oil-product liquid phase to obtain an aqueous layer comprising water-soluble oxygenated organic compounds and a hydrocarbon layer comprising oil-soluble oxygenated organic compounds; separating said layers; subjecting said hydrocarbon layer to extraction treatment with an aqueous solution of a water-soluble alcohol which is a component of said relatively low-boiling fraction to obtain a raffinate phase comprising hydrocarbons and an extract phase comprising oxygenated organic compounds; separating said phases; separating said extract phase into a relatively low-boiling fraction comprising said water-soluble alcohol and oxygenated organic compounds and a relatively high-boiling fraction comprising other oxygenated organic compounds; combining a portion of said last-mentioned relatively low-boiling fraction with said first-mentioned relatively low-boiling fraction obtained from the fractionation of said water-product liquid phase; and separating the streams thus combined into desired components.

2. In a process for treating the reaction product obtained in the hydrogenation of oxides of carbon wherein said reaction product is treated to form an oil-product liquid phase and a water-product liquid phase, each of said phases containing oxygenated organic compounds comprising organic acids and alcohols, and wherein said water-product liquid phase is fractionated into a relatively low-boiling fraction comprising alcohols and a relatively high-boiling fraction comprising organic acids, the improvement which comprises: water-scrubbing said oil-product liquid phase to obtain an aqueous layer comprising water-soluble oxygenated organic compounds and a hydrocarbon layer comprising oil-soluble oxygenated organic compounds; separating said layers; subjecting said hydrocarbon layer to extraction treatment with an aqueous solution of a water-soluble alcohol which is a component of said relatively low-boiling fraction to obtain a raffinate phase comprising hydrocarbons and an extract phase comprising oxygenated organic compounds; separating said phases; separating said extract phase into a relatively low-boiling fraction comprising said water-soluble alcohol and oxygenated organic compounds and a relatively high-boiling fraction comprising other oxygenated organic compounds; combining a portion of said last-mentioned relatively low-boiling fraction with said first-mentioned relatively low-boiling fraction obtained from the fractionation of said water-product liquid phase; separating the streams thus combined into desired components; and returning the remaining portion of said last-mentioned relatively low-boiling fraction in combination with fresh quantities of said water-soluble alcohol to the extraction treatment of said hydrocarbon layer.

3. In a process for treating the reaction product obtained in the hydrogenation of oxides of carbon wherein said reaction product is treated to form an oil-product liquid phase and a water-product liquid phase, each of said phases containing oxygenated organic compounds comprising organic acids and alcohols, and wherein said water-product liquid phase is fractionated into a relatively low-boiling fraction comprising alcohols and a relatively high-boiling fraction comprising organic acids, the improvement which comprises: treating at least a portion of said oil-product liquid phase with alkali to convert organic acids contained therein to their corresponding alkali salts; separating said alkali salts from said treated portion of said oil-product liquid phase; acidifying said alkali salts with an inorganic acid to produce a mixture comprising the corresponding organic acids and inorganic salts; combining the mixture thus produced with said relatively high-boiling fraction; and separating the streams thus combined into desired components.

4. In a process for treating the reaction product obtained in the hydrogenation of oxides of carbon wherein said reaction product is treated to form an oil-product liquid phase and a water-product liquid phase, each of said phases containing oxygenated organic compounds comprising organic acids and alcohols, and wherein water-product liquid phase is fractionated into a relatively low-boiling fraction comprising alcohols and a relatively high-boiling fraction comprising organic acids, and wherein organic acids are separated from said relatively high-boiling fraction, the improvement which comprises: treating at least a portion of said oil-product liquid phase with alkali to convert organic acids contained therein to their corresponding alkali salts; separating said alkali salts from said treated portion of said oil-product liquid phase; acidifying said alkali salts with an inorganic acid to produce a mixture comprising the corresponding organic acids and inorganic salts; separating organic acids from the mixture thus produced; combining organic acids thus separated with organic acids separated from said relatively high-boiling fraction; and separating the streams thus combined into desired components.

5. In a process for treating the reaction product obtained in the hydrogenation of oxides of carbon wherein said reaction product is treated to form an oil-product liquid phase and a water-product liquid phase, each of said phases containing oxygenated organic compounds comprising organic acids and alcohols, and wherein said water-product liquid phase is fractionated into a relatively low-boiling fraction comprising alcohols and organic acids and a relatively high-boiling fraction comprising other organic acids, the improvement which comprises: separately treating at least a portion of said relatively low-boiling fraction with alkali to convert organic acids contained therein to their corresponding alkali salts; separating said alkali salts from said treated portion of said relatively low-boiling fraction; acidifying said alkali salts with an inorganic acid to produce a mixture comprising the corresponding organic acids; separately treating at least a portion of said oil-product liquid phase with alkali to convert organic acids contained therein to their corresponding alkali salts; separating said alkali salts from said treated portion of said oil-product liquid phase; acidifying said alkali salts with an inorganic acid to produce a mixture comprising the corresponding organic acids and inorganic salts; combining the mixture thus produced with the mixture produced from the treatment of said portion of said relatively low boiling fraction; combining the resulting mixture with said relatively high-boiling fraction; and separating the streams thus combined into desired components.

WILLIAM P. BURTON.
HENRY G. McGRATH.

REFERENCES CITED

The following references are of record in the file of this patent:

UNITED STATES PATENTS

| Number | Name | Date |
| --- | --- | --- |
| 1,870,816 | Lewis | Aug. 9, 1932 |
| 2,205,184 | Woodhouse | June 18, 1940 |
| 2,457,257 | Michael et al. | Dec. 28, 1948 |

OTHER REFERENCES

Fischer: "Conversion of Coal in Oils," pages 242–5, London, Ernest Benn Limited (1925).

U. S. Naval Technical Mission in Europe: "The Synthesis of Hydrocarbons and Chemicals From CO and $H_2$," August 2, 1946, pages 84–92.